SYNCHRONOUSLY OPERATED TRANSISTOR SWITCHING CIRCUIT

Filed July 11, 1960

INVENTOR
GENUNG L. CLAPPER

BY G. R. Gugger
AGENT

United States Patent Office 3,146,355
Patented Aug. 25, 1964

3,146,355
SYNCHRONOUSLY OPERATED TRANSISTOR SWITCHING CIRCUIT

Genung L. Clapper, Vestal, N.Y., assignor to International Business Machines Corporation, New York, N.Y., a corporation of New York Filed July 11, 1960, Ser. No. 42,052
4 Claims. (Cl. 307—88.5)

This invention relates to a delay circuit and more particularly to a high frequency synchronized delay line which employes inductance for storage.

Time delay circuits generally use the charging of a capacitor for timing the delay of an input pulse and the output is delayed by a period of time dependent upon the charging of the capacitor to a predetermined level. To overcome the frequency limitations imposed by capacitor timing, an improved circuit has been devised wherein the capacitor performs a minor storage function and an inductance is provided as the main storage element. In the present circuit, the input is applied to the delay circuit through a diode to the junction of another diode and a capacitor. This capacitor performs only a minor storage function, its main function being to couple sync pulses to the junction point. The sync pulses gate the input through the second diode to the junction of an inductor and the base of a PNP transistor. Upon the occurrence of the sync pulse, current flows through the gating diode and through the inductor. When the current reaches a maximum the collapsing field in the inductor causes the base of the transistor to go negative and the transistor conducts. This produces an output pulse on the collector of the transistor delayed by one bit from the input pulse. In addition to operating as a delay circuit, the present circuit operates as a shift register since the output pulse may form the input to a following stage and the input may be shifted through successive stages by the sync pulses. After input information is shifted into several stages, the output of each stage may be read, thereby converting serial input information into parallel output information. Provision is also made for inserting a bit of information into each stage. When this information is shifted out, the parallel input information in converted into serial output information.

Accordingly, a principal object of the present invention is to provide an improved high frequency synchronized delay line.

A further object of the present invention is to provide a high frequency synchronized delay line utilizing an inductance for main storage and capacitance for minor storage.

A still further object of the present invention is to provide an improved delay circuit as in the preceding objects and having transistor coupled stages for operation as a shift register.

The foregoing and other objects, features and advantages of the invention will be apparent from the following more particular description of the preferred embodiment of the invention, as illustrated in the accompanying drawings.

Figure 1:
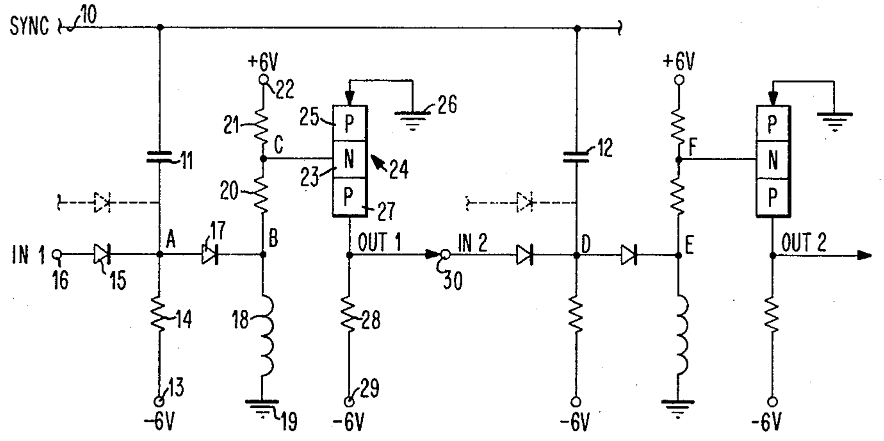
FIGURE 1 is a schematic circuit diagram of two high frequency synchronized delay circuits utilizing an inductance for main storage in accordance with the present invention.
Figure 2:
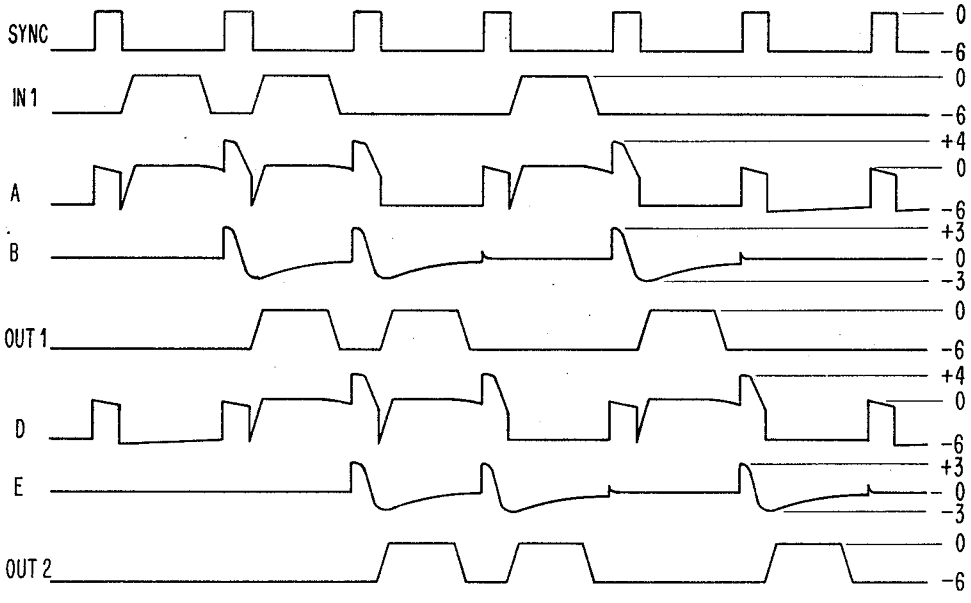
FIGURE 2 is a diagram of the waveforms illustrating the operating characteristics of the circuit of FIGURE 1.

Referring to FIGURE 1, there is shown, for illustrative purposes, a simple two stage application of the present delay circuit. Each stage is identically arranged and a sync pulse train (as shown in FIG. 2) is applied from line 10 to the gate points A and D by way of the coupling capacitors 11 and 12. As will be seen, the capacitors 11 and 12 are not used as main storage elements but they do have a minor storage function in coupling the sync pulses to the gating points A and D. The gate point A is connected to a minus 6 volt terminal 13 through a resistor 14 and it is also connected to the cathode of an input diode 15 which is normally reverse biased in the absence of an input signal at the input terminal 16.

The gate point A is further connected to the plate of a normally reverse biased coupling diode 17 and the cathode of diode 17 is connected to one end of an inductance coil 18 at point B. The other end of the coil 18 is connected to a source of ground potential 19. A voltage divider comprising the resistors 20 and 21 is connected between point B and a positive 6 volt terminal 22 and the mid-point C of the divider is connected to the base electrode 23 of a PNP transistor 24 having a grounded emitter configuration. The emitter electrode 25 is connected to a source of ground potential 26 and the collector electrode 27 is connected through a resistor 28 to a minus 6 volt terminal 29. The collector output of transistor 24 serves as the input to input terminal 30 of the following second stage. The components of the second stage, as well as any succeeding stages, are arranged in the same manner as just described in connection with the first stage.

Referring to both FIGS. 1 and 2, in the operation of the circuit the sync pulse train is applied to the gate points A and D through the coupling capacitors 11 and 12 and, in the absence of an input, the potential at the gate points A and D is raised to ground and the potential at points B and E is not affected. Following termination of the sync pulse, the appearance of an input pulse at the input terminal 16 will render the input diode 15 conductive and the potential at point A will again be raised to ground by charging the sync coupling capacitor 11. If this input terminates before the appearance of the next sync pulse, it is remembered by virtue of the minor storage function of the capacitor 11. Now the next sync pulse will raise the potential at point A from ground to approximately a positive 4 volts rendering the coupling diode 17 conductive and current will flow in the inductance coil 18. The potential at point C will follow the potential at point B which is now at approximately positive 3 volts but the transistor 24 will remain cut off as long as the potential at point B is above ground.

After the current in the coil 18 reaches a maximum value, it is forced to continue by reason of the collapsing field. The termination of the sync pulse will now drop the potential at point A to minus 6 volts and the coupling diode 17 will now cut off. The potential at points B and C will drop to a minus 3 volts and the base of the transistor 24 goes negative with respect to the emitter switching the transistor on. Current now flows in the base circuit and a positive output pulse is formed at the collector of the transistor which is delayed by one bit from the input pulse. It will be noted that the sync coupling capacitor 11 has lost its charge before the sync pulse drops so that it is possible for the sync line to fully restore each gating point. Thus, there is no residual charge or spurious memory build-up.

The delayed output of stage 1 becomes the input at terminal 30 for stage 2 and thus, a pattern of pulses is passed from unit to unit under control of the sync pulse train. Entry may be made to any or all units of a line by auxiliary inputs, shown dotted in FIG. 1, and outputs may be taken from all units at a given time for converting serial information to a parallel representation. Gating of the simplest sort may be used at the inputs to control the entries and a register may hold information static by gating its own output back to its input.

Significant savings may be realized by using the present circuit approach to shift registers, delay lines, serial to parallel conversion, etc. For example, a shift register using current switching in the one megacycle range requires 20 or more transistors. The present circuit will operate reliably in the same range and it requires only one transistor, or two with a push-pull output, plus eight diodes.

While the invention has been particularly shown and described with reference to a preferred embodiment thereof, it will be understood by those skilled in the art that various changes in form and details may be made therein without departing from the spirit and scope of the invention.

What is claimed is:

1. A synchronized delay circuit of the class described comprising, a transistor having emitter, base and collector electrodes, a source of bias voltage having a voltage divider network connected to said base electrode for rendering said transistor normally non-conducting, an inductive element in circuit with said divider network and adapted to store electrical energy, a source of input pulses, a first branch circuit connecting said input pulse source with said inductive element and including gating means, a source of sync pulses, and a second branch circuit connecting said sync pulse source with said gating means and including signal coupling means, the presence of an input pulse followed by a sync pulse conditioning said gating means to cause current flow in said inductive element and said first branch circuit, the termination of said sync pulse serving to decouple said gating means to discharge electrical energy stored in said inductive element as current flow in the base circuit of said transistor to produce a delayed output pulse at said collector electrode.

2. A synchronized delay circuit of the class described comprising, a transistor having emitter, base and collector electrodes, a source of bias voltage having a voltage divider network connected to said base electrode for rendering said transistor normally non-conducting, an inductive element in circuit with said divider network and adapted to store electrical energy, a source of input pulses, a first branch circuit connecting said input pulse source with said inductive element and including gating means, a source of sync pulses, and a second branch circuit connected to said sync pulse source and including a signal coupling storage element connected to said gating means, the presence of an input pulse charging said coupling storage element to shift the potential at said gating means after which the presence of a following sync pulse will further shift the potential at said gating means causing current flow in said inductive element and said first branch circuit, the termination of said sync pulse serving to decouple said gating means to discharge electrical energy stored in said inductive element as current flow in the base circuit of said transistor to produce a delayed output pulse at said collector electrode.

3. A synchronized delay circuit of the class described comprising, a source of sync pulses, a capacitor having one side connected to said sync pulse source, a source of return voltage having a gating junction point connected to the other side of said capacitor, a source of input pulses, a first normally reverse biased diode connected between said input pulse source and said gating junction point, a second junction point, a source of bias voltage having a voltage divider network connected to said second junction point, an inductance coil connected to said second junction point, a second normally reverse biased diode connected between said junction points, the presence of an input pulse serving to render said first diode conducting to charge said capacitor and raise the potential at said gating junction point, the presence of a following sync pulse serving to further raise the potential at said gating junction point whereby said second diode is rendered conductive and current flow takes place in said inductance coil and second diode, a transistor having emitter, base and collector electrodes, means for rendering said transistor normally non-conducting, and means connecting the base of said transistor to said voltage divider network, the termination of said following sync pulse decoupling said second diode whereby current flows from said inductance coil into the base circuit of said transistor and a delayed output pulse is produced at said collector electrode.

4. A multistage pulse advancing circuit comprising a series of transistors each having emitter, base and collector electrodes, a voltage divider network and an inductive element for each transistor adapted for connection to a source of bias voltage and connected to the base electrode of the respective transistor for rendering the transistor normally nonconducting, a plurality of gating means each connected to a respective voltage divider network and inductive element, a plurality of capacitive elements each adapted for connection with a source of sync signals for coupling the sync pulses to a respective gating means, means associated with each transistor and adapted for connection with a source of input signals for coupling the input pulses to a respective capacitor and gating means to condition the gating means in response to an input pulse for causing current flow in the inductive element in response to the next succeeding sync pulse, the termination of the sync pulse serving to decouple the gating means to discharge electrical energy stored in the inductive element as current flow in the base circuit of the transistor to produce a delayed output pulse at the collector electrode, and means connecting the collector electrode outputs to the input pulse coupling means of respective succeeding transistors.

References Cited in the file of this patent

UNITED STATES PATENTS

| | | |
|---|---|---|
| 2,952,784 | Carr | Sept. 13, 1960 |
| 2,956,180 | James | Oct. 11, 1960 |
| 2,963,592 | De Graaf | Dec. 6, 1960 |
| 3,026,422 | Phylip-Jones | Mar. 20, 1962 |

FOREIGN PATENTS

| | | |
|---|---|---|
| 822,937 | Great Britain | Nov. 4, 1959 |